United States Patent
Lin et al.

(10) Patent No.: US 10,523,392 B2
(45) Date of Patent: Dec. 31, 2019

(54) DOWNLINK REFERENCE SIGNALS FOR RADIO RESOURCE MANAGEMENT (RRM) MEASUREMENT

(71) Applicant: MEDIATEK INC., Hsinchu (TW)

(72) Inventors: Hsuan-Li Lin, Hsinchu (TW); Pei-Kai Liao, Hsinchu (TW); Chien-Chang Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/864,838

(22) Filed: Jan. 8, 2018

(65) Prior Publication Data
US 2018/0198585 A1    Jul. 12, 2018

Related U.S. Application Data

(60) Provisional application No. 62/443,846, filed on Jan. 9, 2017.

(51) Int. Cl.
| | | |
|---|---|---|
| *H04L 5/00* | (2006.01) | |
| *H04L 12/801* | (2013.01) | |
| *H04B 7/06* | (2006.01) | |
| *H04W 4/70* | (2018.01) | |
| *H04W 24/10* | (2009.01) | |

(52) U.S. Cl.
CPC ........... *H04L 5/0048* (2013.01); *H04W 24/10* (2013.01)

(58) Field of Classification Search
CPC ..... H04L 5/0048; H04L 5/005; H04L 5/0051; H04L 5/0023; H04W 24/10
See application file for complete search history.

(56) References Cited

U.S. PATENT DOCUMENTS

| | | | |
|---|---|---|---|
| 9,781,692 B2 | 10/2017 | Gou et al. | |
| 2002/0131365 A1* | 9/2002 | Barker | H04L 47/10 |
| | | | 370/235 |
| 2015/0055632 A1 | 2/2015 | Gou et al. | |
| 2016/0094287 A1* | 3/2016 | Kim | H04B 7/024 |
| | | | 370/329 |
| 2016/0242170 A1* | 8/2016 | Xu | H04W 4/70 |
| 2016/0337101 A1 | 11/2016 | Gao et al. | |
| 2017/0374637 A1* | 12/2017 | Akkarakaran | H04B 7/0617 |

FOREIGN PATENT DOCUMENTS

| | | |
|---|---|---|
| CN | 103391265 A | 11/2013 |
| CN | 104796218 A | 7/2015 |
| CN | 107689839 A | 2/2018 |

OTHER PUBLICATIONS

International Search Report and Written Opinion dated Mar. 27, 2018 in PCT/CN2018/071939.

(Continued)

*Primary Examiner* — Kiet Tang
(74) *Attorney, Agent, or Firm* — Oblon, McClelland, Maier & Neustadt, L.L.P.

(57) ABSTRACT

Aspects of the disclosure provide a method for transmission of downlink mobile reference signals (MRSs). The method can include transmitting an MRS that includes a first part MRS and an additional part MRS, wherein the first part MRS includes first MRS bursts each multiplexed with a synchronization signal block (SS block), and the additional part MRS includes second MRS bursts and is configurable to be transmitted or not transmitted.

21 Claims, 6 Drawing Sheets

(56) References Cited

OTHER PUBLICATIONS

"WF on Mobility RS", Samsung, et al., 3GPP TSG RAN WG1 Meeting #87, R1-1613678, 7.1.2.6, Nov. 2016, 4 pages.
"WF on NR RRM Measurements", AT&T, Ericsson, 3GPP TSG RAN WG1 Meeting #87, R1-1613140, 7.1.2.6, Nov. 2016, 3 pages.
"Enabling beam grouping by UE in mobility RS measurements", Ericsson, 3GPP TSG-RAN WG1 Meeting #87, R1-1611916, 7.1.2.6, Nov. 2016, 8 pages.
Catt, "NR mobility and RS design", R1-1702068, 3GPP TSG RAN WG1 88, Athens, Greece, — Feb. 13-17, 2017.
LG Electronics, "Views on RS for beam management", R1-1611821, 3GPP TSG RAN WG1 Meeting 87, Reno, USA Nov. 14-18, 2016.
Office Action dated Jul. 29, 2019 in Taiwanese Application No. 10820714190 citing documents AW and AX therein.

\* cited by examiner

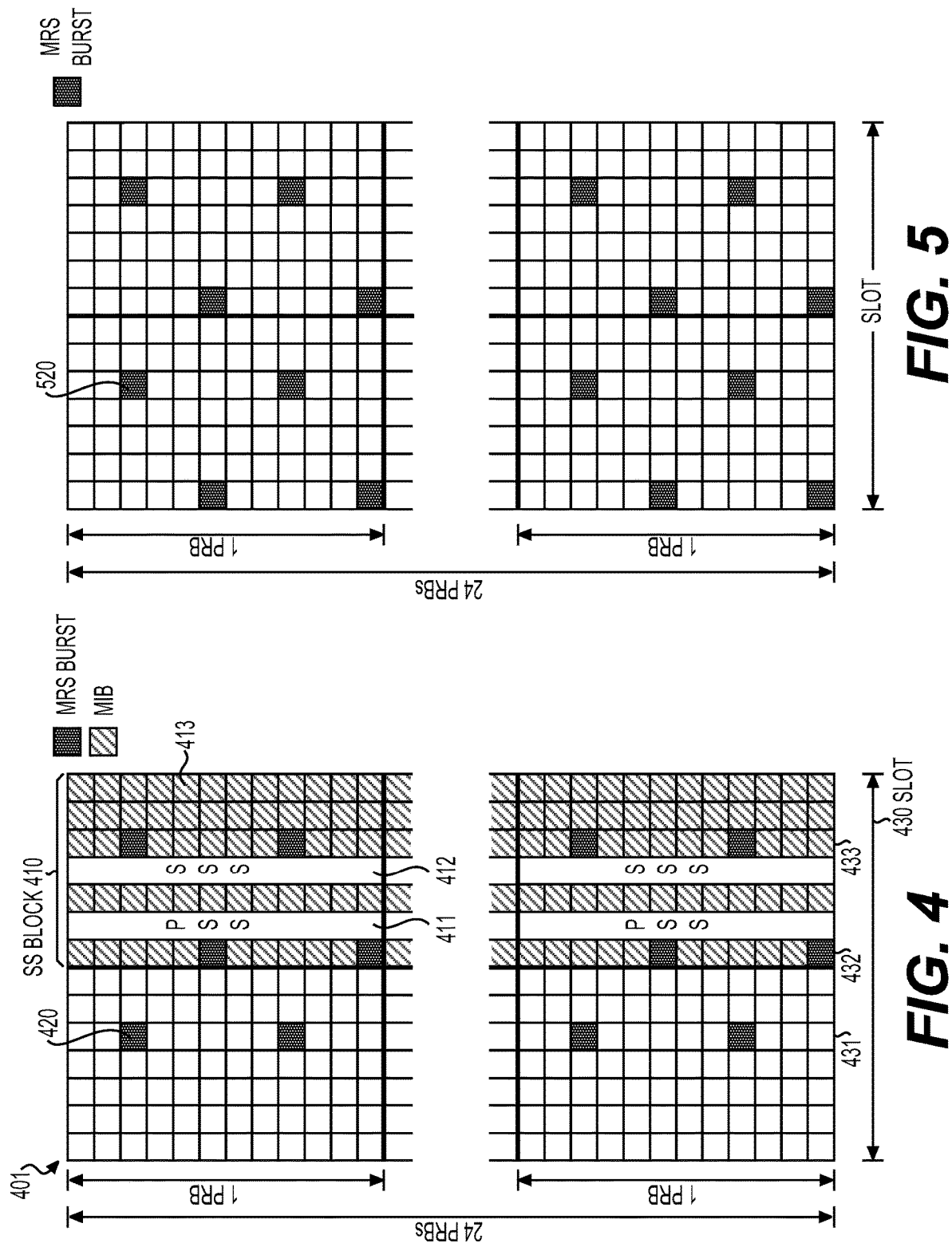

DOWNLINK REFERENCE SIGNALS FOR RADIO RESOURCE MANAGEMENT (RRM) MEASUREMENT

INCORPORATION BY REFERENCE

This present disclosure claims the benefit of U.S. Provisional Application No. 62/443,846, "Transmission of Mobility Reference Signal (MRS) for DL RRM measurement" filed on Jan. 9, 2017, which is incorporated herein by reference in its entirety.

TECHNICAL FIELD

The present disclosure relates to wireless communications, and specifically relates to downlink reference signals for radio resource management (RRM) measurement.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In Long Term Evolution (LTE) networks, common reference signal (CRS) can be transmitted in every subframe over a full carrier bandwidth. Radio resource management (RRM) measurement can be performed based on the CRS. However, in New Radio (NR) air interface, the always-on wideband CRS is removed in order to reduce reference signal overhead, inter-cell interference, and user equipment (UE) power consumption. New reference signal design can be introduced for RRM measurement in NR system.

SUMMARY

Aspects of the disclosure provide a method for transmission of downlink mobile reference signals (MRSs). The method can include transmitting an MRS that includes a first part MRS and an additional part MRS, wherein the first part MRS includes first MRS bursts each multiplexed with a synchronization signal block (SS block), and the additional part MRS includes second MRS bursts and is configurable to be transmitted or not transmitted.

In an embodiment, the method can further include transmitting a first or second MRS burst including a plurality of MRS symbols on a series of beams during a beam sweeping. An MRS sequence transmitted on a beam can be generated based on a beam index of the beam.

In one example, a burst length of a first or second MRS burst is configurable. In an embodiment, the method can further include transmitting an MRS configuration corresponding to a serving cell or a neighboring cell of a UE. The MRS configuration can include one or more of following configuration parameters defining second MRS bursts transmitted from the corresponding cell to the UE: transmission periodicity, time offset with respect to SS block, transmission bandwidth, burst duration, and frequency domain location. In one example, the transmission periodicity is determined according to a speed of the UE.

In one example, sequences of the MRS are generated based on one or more of a cell identification (ID), a transmission reception point (TRP) ID, or a transmission (Tx) beam of a serving cell transmitting the MRS. In one example, a frequency domain location of the first or second MRS bursts depends on a cell ID, a TRP) ID, or a Tx beam index of a serving cell transmitting the MRS. In one example, the first or second RS bursts are transmitted in subframes or slots of a serving cell where neighboring cells do not have uplink transmissions.

Aspects of the disclosure provide a method for radio resource control (RRC) connected mode radio resource management (RRM) measurement. The method can include receiving at a UE MRS configurations corresponding to a serving cell and neighboring cells of the UE, receiving MRSs transmitted from the serving cell and the neighboring cells of the UE according to the MRS configurations, wherein each MRS includes a first part MRS and an additional part MRS, and the first part MRS includes first MRS bursts each multiplexed with a SS block, and the additional part MRS includes second MRS bursts and is configurable to be transmitted or not transmitted, and generating RRM measurements based on the received MRSs.

In an embodiment, the method can further include, based on the received MRSs, performing one or more of following functions: demodulation of a physical broad cast channel (PBCH) in an SS block multiplexed with a first MRS burst, time and/or frequency synchronization tracking, or channel property estimation. In an embodiment, the method can further include receiving a first or second MRS burst including multiple MRS symbols from a series of beams transmitted from the serving cell or one of the neighboring cells during a beam sweeping.

Aspects of the disclosure provide a method for RRC idle mode RRM measurement. The method can include receiving at a UE MRSs transmitted from a serving cell and neighboring cells of the UE, wherein each MRS includes first MRS bursts each multiplexed with a SS block, wherein each MRS is generated based on a cell ID, a TRP ID, and/or a beam index of a respective cell corresponding to the MRS, and generating RRM measurements based on the received MRSs.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows an example synchronization signal (SS) block multiplexed with a first MRS burst in an SS region according to an embodiment of the disclosure;

FIG. 5 shows an example second MRS burst according to an embodiment of the disclosure;

DETAILED DESCRIPTION OF EMBODIMENTS

Figure 1:
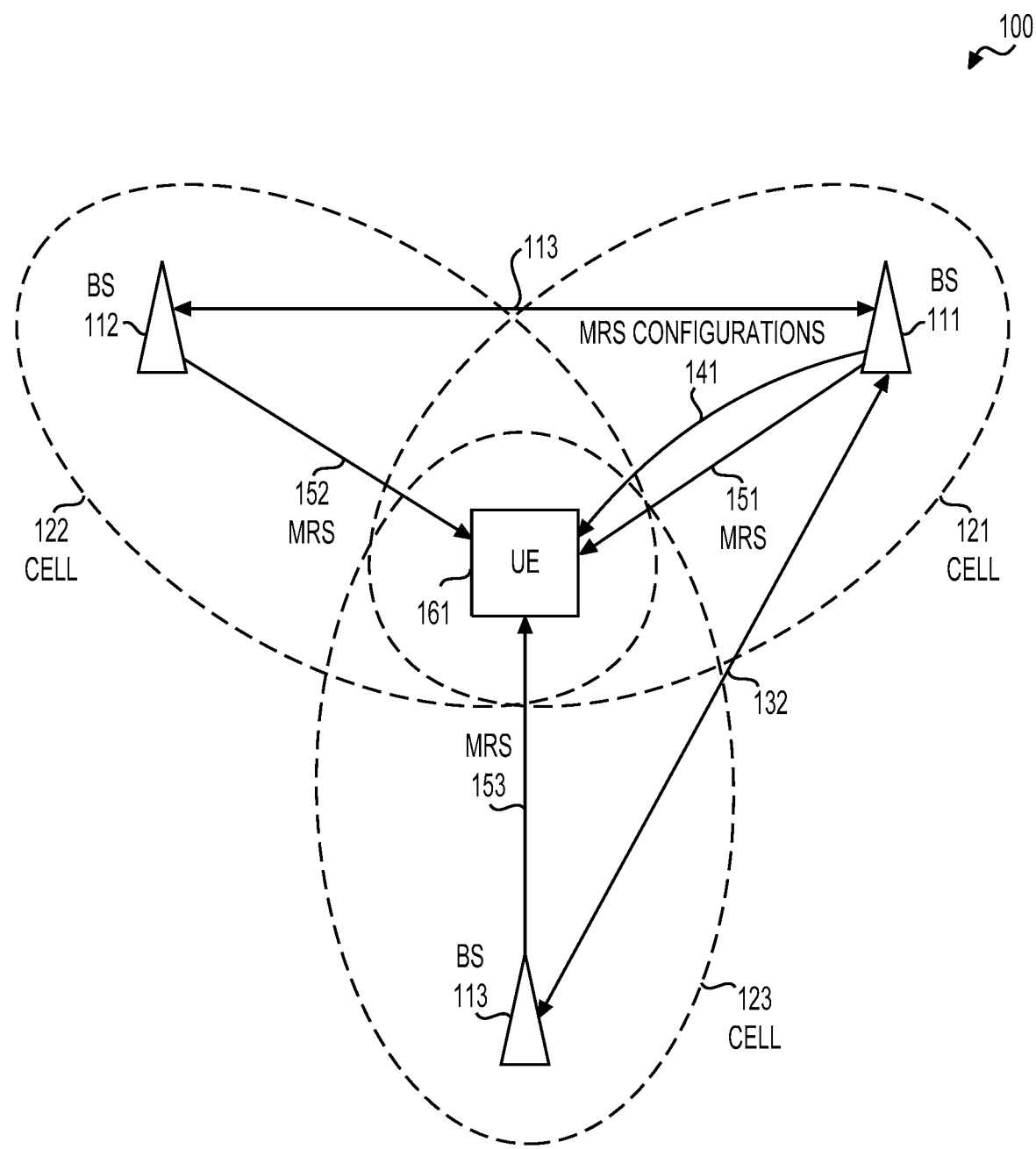
FIG. 1 shows a wireless communication network according to various embodiments of the disclosure.

FIG. 1 shows a wireless communication network 100 according to various embodiments of the disclosure. The network 100 can include a plurality of base stations 111-113 and a user equipment 161. Each base station 111-113 corresponds to a cell 121-123. For example, each base 111-113 can control a transmission and reception point (TRP) to transmit a wireless signal to cover a respective cell 121-123. In one example, the network 100 is compliant with the fifth generation (5G) New Radio (NR) communication standards developed by the 3rd Generation Partnership Project (3GPP). Accordingly, each base station 111-113 can be an implementation of a gNB specified by the 3GPP NR air interface standards. The UE 161 can be a mobile phone, a laptop computer, a vehicle carried device, and the like. The UE 161 can communicate with each base station 111-113 according to the 3GPP NR air interface standards. In alternative examples, the network 100 may operate according to other wireless communication standards.

In one example, the UE 161 operates in radio resource control (RRC) connected mode and performs a radio resource management (RRM) measurement and report process to facilitate a hand over operation. For example, the UE 161 is connected to the base station 111, and data or signal radio bearers can be established between the UE 161 and the base station 111. Thus, the cell 121 is a serving cell of the UE 161. While operating in connected mode, the UE 161 may monitor signal quality of the serving cell 121, for example, by calculating reference signal received power (RSRP) of a reference signal received from the serving cell 121. When the RSRP is below a threshold, for example, due to mobility of the UE 161, the UE 161 may report to the base station 111. As a response, the base station 111 may send a connected mode RRM measurement configuration to the UE 161, and control the UE 161 to perform the RRM measurement and report process.

Particularly, the connected mode RRM measurement configuration may include mobile reference signal (MRS) configurations 141 of the serving cell 121 and neighboring cells of the UE 161. For example, the base station 111 can coordinate with the base stations 112-113 to determine an MRS configuration for each neighboring cell 122-123 and the serving cell 121, and subsequently provide the MRS configurations 141 to the UE 161. For example, the base station 111 can communicate with the base stations 112-123 through interfaces 131-132 that can be similar to an X2 interface defined in Long Term Evolution (LTE) standards.

Based on the connected mode RRM measurement configuration and the MRS configurations 141, the UE 161 can perform an RRM measurement process. During an RRM measurement process, signal quality of a cell can be measured by calculating some measurement quantities, such as RSRP measurements, based on reference signals (RSs) received from the cell. In one example, the MRS configurations 141 may specify MRS configuration parameters of a set of MRSs 151-153 transmitted from the serving cell 151 and the neighboring cells 122-123. For example, the MRS configuration parameters of an MRS 151-153 can include timing information, measurement bandwidth, location information of respective resource elements (REs), and the like such that the UE 161 can capture MRS transmission occasions accordingly. For example, the UE 161 may accordingly perform inter-frequency or intra-frequency measurement, and generate RSRP measurements and/or reference signal received quality (RSRQ) measurements for the serving cell 111 and the neighboring cells 112. The UE 161 may subsequently report the RRM measurements to the base station 111 when certain conditions are satisfied (for example, as specified by the connected mode RRM measurement configuration, a serving cell signal quality is below a neighboring cell signal quality for a certain time period). Based on the RRM measurements received from the UE 161, the base station 111 can determine to trigger a hand over process to switch the UE 161 to a neighboring cell.

In another example, the UE 161 operates in RRC idle mode, and performs an RRM measurement and report process to facilitate a cell reselection operation. For example, the UE 161 camps on the base station 111, and the cell 121 operates as a serving cell. The UE 161 can receive an idle mode RRM measurement configuration from the base station 111. For example, the idle mode RRM measurement configuration can be included in system information broadcasted from the base station 111, and received by the UE 161. Similar to the connected mode, the idle mode RRM measurement configuration can include MRS configurations 141 specifying configuration parameters of MRSs 151-153 transmitted from the serving cell 121 and the neighboring cells 112-113.

The UE 161 can monitor signal quality of the serving cell 121 while camping on the base station 111. For example, when the signal quality of the serving cell 121 is below a threshold (due to mobility of the UE 161) specified in the idle mode RRM measurement configuration, an RRM measurement process can be triggered. The UE 161 can perform the RRM measurement based on the idle mode RRM measurement configuration and the MRS configurations 141. For example, the UE 161 can perform intra frequency or inter frequency measurement based on MRSs 151-153 received from the serving cell 121 and the neighboring cells 122-123, and generate RSRP measurements and/or RSRQ measurements for the serving cell 121 and the neighboring cells 112-113. Based on those RRM measurements, the UE 161 can determine to switch from the current serving cell 121 to another neighboring cell when certain conditions (as specified in the idle mode RRM measurement configuration) are satisfied.

In an embodiment, an MRS transmitted from the cells 121-123 can include a first part and an additional part. The first part MRS can be an always-on signal and include one or more first RS bursts. Each first RS burst can be multiplexed with a synchronization signal block (SS block) during transmission. An SS block refers to a region of resource elements (REs) in an orthogonal frequency division multiplexing (OFDM) time-frequency resource grid, and includes synchronization signals (such as primary synchronization signal (PSS) and secondary synchronization signal (SSS) in an LTE or NR system) and a physical broad cast channel (PBCH) carrying a master information block (MIB). SS blocks can be broadcasted periodically from a base station, and can be used by a UE in an initial access procedure to obtain downlink synchronization and MIB system information.

The additional part MRS can include one or more second RS bursts. Particularly, transmission of the additional part MRS can be configured adaptively, for example, according to a speed of the UE 161 to facilitate RRM measurement. For example, when the UE 161 moves with a low speed, the additional part MRS may not be transmitted. As a result, a periodicity of the MRS is decided by transmission of the first MRS bursts. In contrast, when the UE 161 moves with a high speed, the additional part MRS can be transmitted to increase the periodicity of the MRS. Thus, performance of hand over operation can be improved for a high mobility UE.

Accordingly, for the above connected mode RRM measurement process, the MRS 151-153 can be configured to include both the first RS bursts and the additional bursts. For example, when the UE 161 reports to the base station 111 that the signal quality is below the threshold, in coordination with the neighboring cells 122-123, the base station 111 can configure the MRS 151-153 adaptively, for example, according to a speed of the UE 161. For example, the UE 161 can report the speed to the base station 111 together with reporting the signal quality. The base station 111 can generate the MRS configurations 141 specifying configuration parameters of first part MRSs and additional part MRSs, and signal the MRS configurations 141 to the UE 161.

In contrast, for the above idle mode RRM measurement process, the idle mode RRM measurement process can be performed based on first part MRSs received from the serving cell 121 and neighboring cells 122-123 without configuration of additional part MRSs. When a UE operating in idle mode moves across a cell border, cell reselection decision may be determined by the UE itself, and nearby base stations may be unaware of the movement of the UE. Thus, no configuration of the additional part MRS is conducted.

Figure 2:
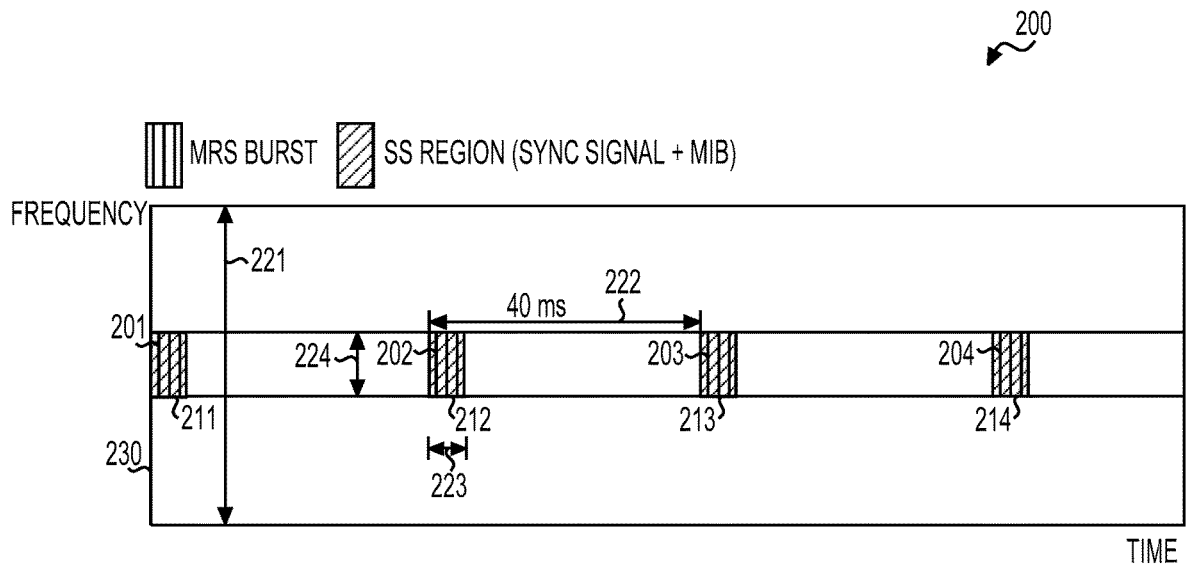
FIG. 2 shows an example mobile reference signal (MRS) configuration according to an embodiment of the disclosure.

FIG. 2 shows an example MRS configuration 200 according to an embodiment of the disclosure. An OFDM time-frequency resource region 230 is shown in FIG. 2. The region 230 can correspond to a downlink wireless signal transmitted from a base station 111-123 in FIG. 1 example. The region 230 can include a plurality of subcarriers in frequency domain corresponding to a carrier bandwidth 221 and a plurality of subframes in time domain. In one example, depending on carrier numerology configuration of a base station 111-123, each subframe can include 1, 2, 3, or 4 slots, and each slot can include 7 or 14 OFDM symbols. A numerology of a carrier frequency can be defined by a subcarrier spacing used by the carrier frequency. For example, different numerologies can have a subcarrier spacing of 15 KHs, 30 KHz, 60 Khz, and the like. Corresponding to different numerology, different subframe structures can be defined.

As shown, a sequence of SS regions 211-214 are included in the region 230 and positioned in center subcarriers of the carrier bandwidth 221. An SS region can be defined as a rectangular region of REs that includes one or more first MRS bursts multiplexed with one or more SS blocks. An SS region can have a transmission bandwidth 224 in frequency domain equal to a bandwidth of a contained SS block and a time length 223 in time domain equal to a number of consecutive slots each including an SS block or a MRS burst.

The MRS configuration 200 defines a MRS that includes a first part MRS that includes a sequence of first MRS bursts 201-204. The first MRS bursts 201-204 in the MRS configuration 200 are each contained in one of the SS regions 211-214, and thus are each multiplexed with one or more SS blocks in the respective SS region 211-214.

Each SS region 211-214 can include one SS block, or a sequence of SS blocks. The sequence of SS blocks can be referred to as an SS burst. The SS block or SS burst can be broadcasted periodically. In FIG. 2 example, a periodicity 222 of the SS block or SS burst transmission is 40 ms. As each first MRS burst 201-204 is multiplexed with an SS block or SS burst, a transmission periodicity of the first MRS bursts 201-204 is also 40 ms.

Figure 3:
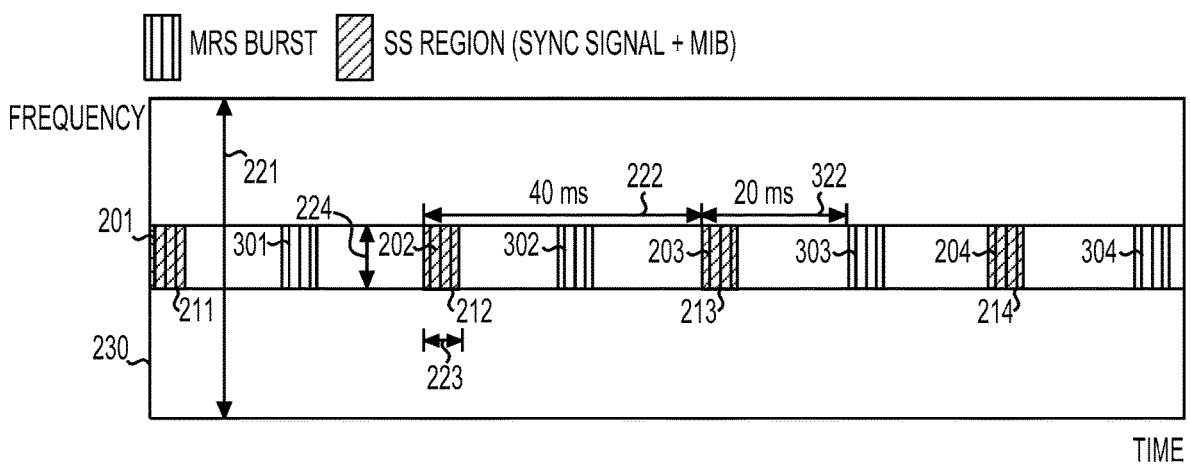
FIG. 3 shows another example MRS configuration according to an embodiment of the disclosure.

FIG. 3 shows another example MRS configuration 300 according to an embodiment of the disclosure. The MRS configuration 300 defines an MRS that includes a first part and an additional part. Specifically, the first part MRS includes the first MRS bursts 201-204 in the sequence of SS regions 211-214 in the FIG. 2 example, and the additional part MRS include a sequence of second MRS bursts 301-304 that are inserted in the middle between two first MRS bursts. In one example, the second bursts 301-304 each have a same structure as the first bursts 201-204. As shown, the MRS configured by the MRS configuration 300 has a transmission periodicity (20 ms) that is a half of the transmission periodicity (40 ms) of the first MRS bursts 201-204 in FIG. 2 example.

In alternative examples, more than one second MRS bursts can be added between two first MRS bursts such that different MRS transmission periodicities can be obtained. As an example, corresponding to FIG. 2 example, when 3 or 7 second MRS bursts are inserted between two first MRS bursts, 10 ms or 5 ms MRS transmission periodicity can be obtained.

In some examples, an MRS including first MRS bursts and second MRS bursts may not be evenly distributed in time domain. Transmission timings of the second MRS bursts can accordingly be specified using other parameters other than an MRS transmission periodicity. For example, a time offset with respect to a previous first MRS first can be specified for a second MRS burst following the previous first MRS. Of course, for evenly distributed first and second MRS bursts, time offsets to a first MRS burst can also be used as a parameter for specifying a timing of following second MRS bursts.

While in FIG. 3 example the second MRS bursts 301-304 are assumed to have a similar structure as the first MRS bursts 201-204, in alternative examples, first and second MRS bursts may have different structures. For example, first and second MRS bursts of a same MRS may have different transmission bandwidths, different burst lengths (a time interval a first or second MRS burst lasts is referred to as a burst length, or a burst duration), and different frequency domain locations of MRS REs in an MRS burst.

FIG. 4 shows an example SS block 410 multiplexed with a first MRS burst 420 in an SS region 401 according to an embodiment of the disclosure. The SS block 410 can have duration of 7 OFDM symbols in time domain and a bandwidth of 24 physical resource blocks (PRBs) in frequency domain. The SS block 410 can carry PSS 411, SSS 412, and MIB 413 in respective REs. The first MRS burst 420 is carried in REs belonging to three symbols 431-433 in a slot 430 including 14 symbols. A symbol carrying REs of an MRS is referred to as an MRS symbol. As shown, a part of the first MRS burst (in the MRS symbols 432 and 433) is included in the SS block 410. Accordingly, this part of the first MRS burst 420 can be used as a demodulation RS for demodulation of a PBCH including the MIB 413 during an initial access procedure.

Scalable numerology with scaling of subcarrier spacing can be used in a NR system. Accordingly, the SS block 410 can occupy different transmission bandwidth in frequency domain and have different duration in time domain depending on a numerology configuration of a carrier carrying the SS block 410. For example, for a numerology configuration of a 15 KHz or 60 KHz subcarrier spacing, the bandwidth of the SS block 410 occupying 24 PRBs can be 5 MHz or 20 MHz, respectively, and the duration of the SS block 410 lasting 7 symbols can be 0.5 ms or 0.125 ms, respectively.

Similarly, the SS region 401 which has a time length of 14 symbols in time domain and the same bandwidth as the SS block 410 may occupy different bandwidths and last for different time for different numerology configurations. In addition, a bandwidth of the first MRS burst 420 (that equals the bandwidth of the SS block 410 in FIG. 4 example in terms of number of PRBs) can also vary for different numerology configurations.

In various examples, the first MRS burst 420 can have different configurations. In FIG. 4 examples, the first MRS burst 420 occupies three symbols, and a portion of the MRS burst 420 (the MRS symbol 431) is positioned outside the SS block 410. In other examples, symbols carrying first MRS burst can be included in the SS block 410. Accordingly, a first MRS burst may have a different burst length depending on MRS configurations. For example, a burst length of an MRS first burst can be longer than duration of an SS block or an SS burst that is multiplexed with the MRS burst.

It is noted that in various examples, SS blocks can have different structures. In one example, an SS block is configured to last for 4 symbols in time domain and have a format of PSS-PBCH-SSS-PBCH where PSS and SSS are carried in the first and third symbols, and PBCH is carried in the second and fourth symbols. In frequency domain, this SS block can have a bandwidth of 24 PBRs that is similar to FIG. 4 example.

FIG. 5 shows an example second MRS burst 520 according to an embodiment of the disclosure. The second MRS 520 can correspond to the first MRS burst 420 in FIG. 4 example, and can be configured to be transmitted together with the first MRS burst 420 to form an MRS. As shown, the second MRS 520 can have a same bandwidth as the first burst 420 in terms of number of PRBs, and be distributed on 4 MRS symbols in time domain. In alternative examples, as part of a same MRS that includes the first MRS burst 420 and the second MRS burst 520, the second MRS burst 520 can be configured with a burst length and a bandwidth that are different from FIG. 5 example. For example, in order to increase RRM measurement accuracy, the second MRS burst 520 can be configured with a wider transmission bandwidth (e.g., wider than 24 PRBs) and a larger burst length (e.g., 1 ms or 2 ms).

During an RRM measurement process, a UE can receive multiple MRSs from a serving cell and multiple neighboring cells. The multiple MRSs can be transmitted from multiple TRPs on a same carrier frequency. In addition, beamforming technology can be employed by the multiple TRPs, and accordingly a first or second MRS burst can include RS sequences transmitted from different transmission (Tx) beams from a TRP. Accordingly, in one example, MRS frequency locations are configured to be dependent on cell identification (ID), TRP ID, and/or Tx beam index in order to reduce interferences between the multiple MRSs received from the multiple neighboring cells and the serving cell. For example, for MRS transmission from different TRPs and different Tx beams, a RE mapping pattern for mapping respective MRS sequences to REs in a time-frequency grid can be frequency shifted by a number of subcarriers in frequency domain based on corresponding cell ID, TRP ID, and/or Tx beam index.

In an alternative example, in order to identify MRS transmission from different cells, TRPs or Tx beams, MRS sequences can be generated based on cell ID, TRP ID, and/or beam index. For example, for an MRS configured for a specific cell, a specific TRP and a specific Tx beam, an initialization value for generating a respective MRS sequence can be dependent on a respective cell ID, TRP ID, and/or Tx beam index.

In some examples, locations of first and second MRS bursts in time domain are configured to be in a downlink part of a downlink only or downlink major subframe or slot. In a subframe or slot of a downlink major subframe or slot type, a downlink part can occupy a longer portion of the subframe or the slot than an uplink part.

In one example, MRS bursts can be configured to be located in subframes or slots where neighboring cells may not have uplink transmission. In this way, inter-cell downlink-to-uplink collision due to dynamic time division multiplex (TDD) can be avoided for downlink transmission of MRS bursts.

Figure 6A:
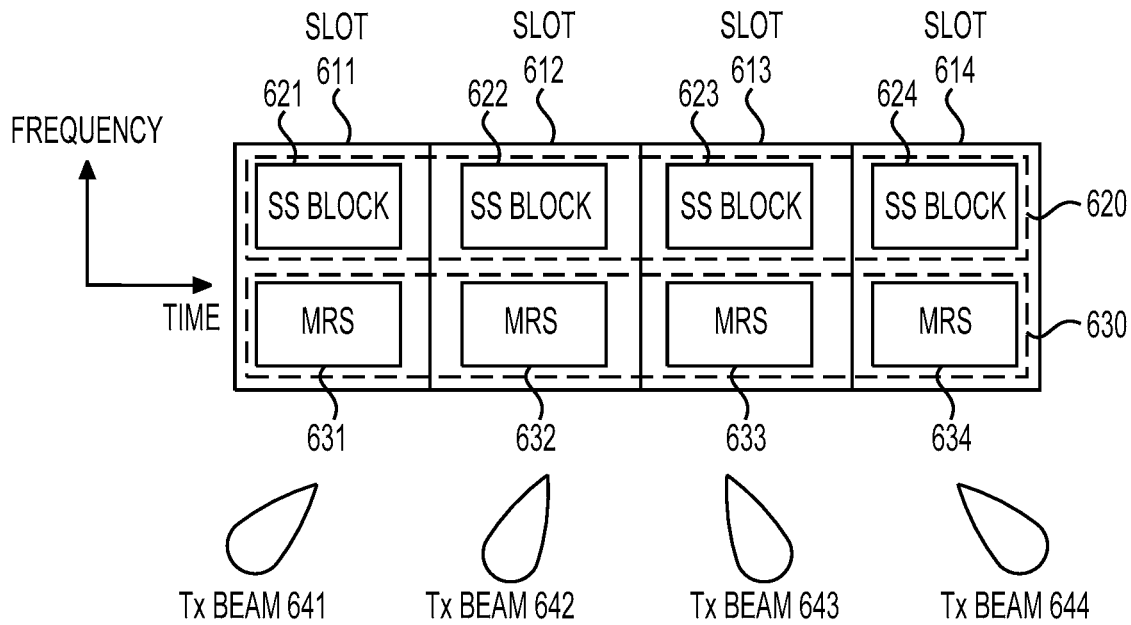
FIG. 6A shows an example first MRS burst multiplexed with an SS burst according to an embodiment of the disclosure.

FIG. 6A shows an example first MRS burst 630 multiplexed with an SS burst 620 according to an embodiment of the disclosure. The first MRS burst 620 includes a sequence of MRSs 631-634 transmitted in a sequence of slots 611-614, respectively. A burst length of the first MRS burst 620 can equal about four slots. The SS burst 620 includes a sequence of SS blocks 6221-624 transmitted in the sequence of slots 611-614, respectively. Similarly, a burst length of the SS burst 620 can last about four slots. Although each pair of SS block and MRS in one slot 611-614 are represented as two separate rectangles, REs of the MRS and the respective SS block can be mixed together as shown in FIG. 4 example.

The sequence of slots 611-614 can be transmitted on a series of Tx beams 641-644 from a TRP. For example, the TRP can sequentially transmit different beams 641-644 towards different directions to cover a cell (such an operation can be referred to as a Tx beam sweeping). In addition, transmission of the SS burst 620 and the MRS burst 630 can be repeated with a periodicity, for example, 40 ms. Accordingly, during an RRM measurement process, a UE may receive the first MRS burst 630 transmitted on the series of Tx beams 641-644 from the TRP. In order to facilitate the UE to distinguish MRSs 631-634 received from the series of Tx beams, the MRSs 631-634 of the first MRS burst 630 can each be generated based on beam indexes of the Tx beam 641-644, respectively. For example, an initialization value for generating an MRS 631-634 can be generated using a respective beam index of one of the Tx beams 641-644. As a result, each of the MRSs 631-634 can be beam specific. The beam indexes can be configured to the UE that can accordingly distinguish different Tx beams 641-644, for example, using a correlation based scheme when generating RRM measurements based on the MRS 631-634.

In one example, the UE can also employ beamforming technology to receive the first MRS burst 630 as well as the SS burst 620. For example, each MRS 631-634 can include multiple MRS symbols each carry an MRS sequence. During transmission of a slot 611-614, the UE can sequentially generate a series of reception (Rx) beams towards different directions (referred to as a Rx beam sweeping), and each Rx beam can corresponding to an MRS symbol in terms of transmission or reception time. By performing such a beam training process, a best Rx beam of the UE can be determined for reception from the respective TRP. In addition, during an RRM measurement process, RRM measurements (e.g., RSRP, RSRQ, etc.) can be calculated for different Rx beams for better estimation of a signal quality of a neighboring cell.

Figure 6B:
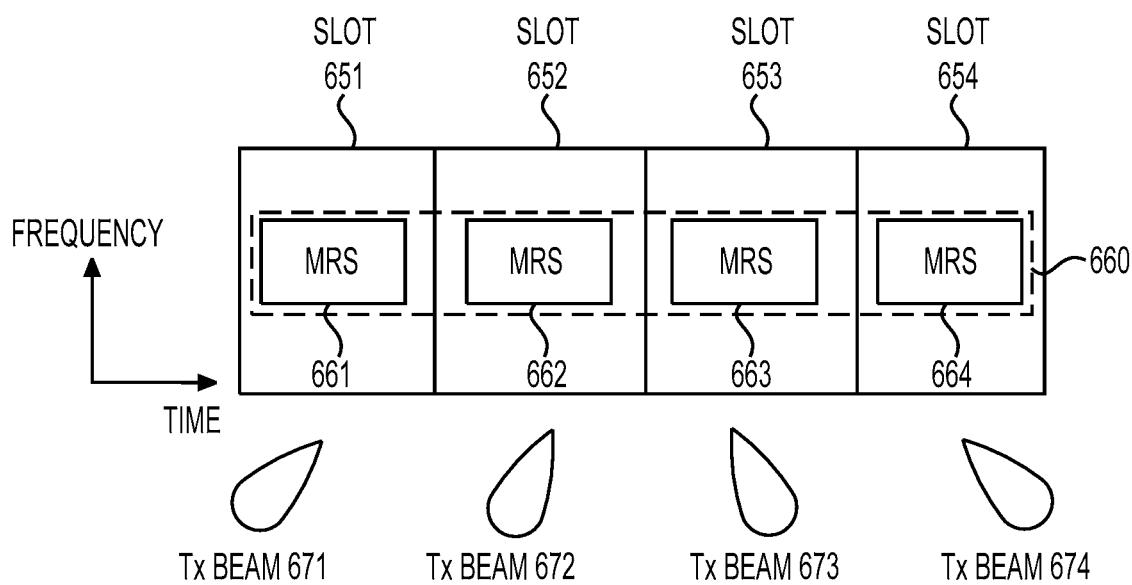
FIG. 6B shows an example second MRS burst according to an embodiment of the disclosure.

FIG. 6B shows an example second MRS burst 660 according to an embodiment of the disclosure. The second MRS burst 660 can be configured to be transmitted following the first MRS burst 630 in FIG. 6A example to form an MRS. Similar to FIG. 6A example, the second MRS burst 660 can include a sequence of MRSs 661-664 that are transmitted in a sequence of slots 651-654. Each MRS 661-664 or slot 651-654 can be transmitted on one of a series of Tx beams 671-674. Similarly, the MRS 661-664 can be Tx beam specific such that a UE can distinguish different Tx beams when determining signal qualities based on the MRS 661-664.

Figure 7:
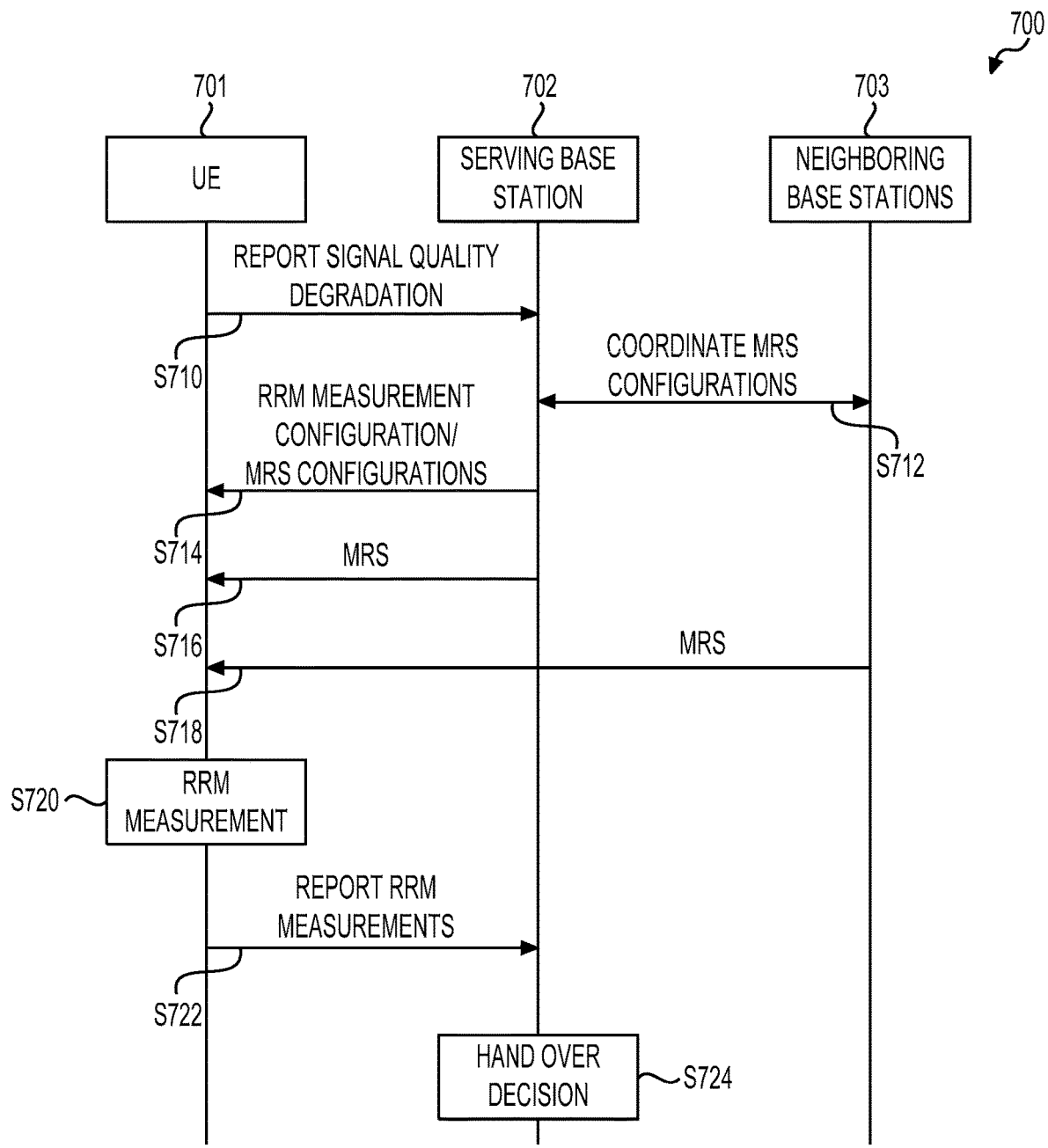
FIG. 7 shows an example radio resource control (RRC) connected mode radio resource management (RRM) measurement and report process according to an embodiment of the disclosure.

FIG. 7 shows an example RRC connected mode RRM measurement and report process 700 according to an embodiment of the disclosure. During the process 700, a UE 701, a serving base station 702 and a set of neighboring base stations 703 communicate with each other and perform steps of the process 700. The UE 701 operates in RRC connected mode, and is associated with the serving base station 702. In addition, the UE 701 can be located within coverage of the neighboring base stations 703. The UE 701 can be in a moving state, and the process 700 can be performed to determine an appropriate neighboring base station (other than the serving base station 702) for the UE 701 to associate with. The process can start from S710.

S710, the UE 701 reports a signal quality degradation to the serving base station 702. For example, the serving base station 702 can transmit an MRS that includes first MRS bursts. The first MRS bursts can be multiplexed with SS blocks, and are transmitted periodically. The UE 701 can receive those first MRS bursts to monitor signal quality of the serving base station 702. For example, RSRP measurements can be generated based on the received MRS. Due to mobility, the UE 701 can detect a signal degradation of the MRS. When signal quality of the MRS is below a threshold for a preconfigured time, the UE 701 can be triggered to report to the serving cell base station 702.

At S712, the serving base station 702 coordinates with the neighboring base stations 703 to determine a set of MRS configurations of the serving base station 702 and the neighboring base stations. In one example, each base station 702 or 703 may control multiple TRPs to form multiple cells. The serving base station 702 can be configured with a list of neighboring cells associated with the neighboring base stations 703. Accordingly, the serving base station 702 can have knowledge of cells neighboring the UE 701.

In one example, as a result of this coordination process, the MRS configurations for each of the neighboring cells of the UE 701 and a serving cell of the UE 701 can be determined. For example, an MRS configuration of a neighboring cell can specify the following configuration parameters: timing of MRS bursts (such as transmission periodicity, time offset with respect to SS block, and the like), transmission bandwidth, burst length of MRS bursts, and the like. In addition, an MRS configuration of a neighboring cell can include cell related information, such as cell ID, TRP ID, Tx beam index, and the like, which are collected from the neighboring base stations 703 or preconfigured to the serving base station 702.

In some examples, the serving base station 702 can determine some MRS configuration parameters based on a moving speed of the UE 701. For example, when the UE 701 is in low mobility, second MRS bursts may not be configured for the UE 701. When the UE 701 is in high mobility, second MRS bursts with a suitable transmission periodicity can be configured. Additionally, burst length and transmission bandwidth of first and/or second MRS burst can also be adjusted based on a speed of the UE 701.

At S714, the serving base station 702 can transmit an RRM measurement configuration to the UE 701 triggering the UE 701 to perform an RRM measurement process. For example, transmission of the RRM measurement configuration can be performed through RRC signaling. The RRM measurement configuration can include the MRS configurations of each of the neighboring cells and the serving cell of the UE 701. Alternatively, the MRS configurations can be transmitted separately from the RRM measurement configuration. For example, the MRS configurations can be transmitted through RRC signaling, broadcasted or multi-casted system information, or a combination of RRC signaling and system information.

In addition, the RRM measurement configuration may include other specifications, such as measurement object including a list of to-be-measured and their operation frequencies, reporting configuration, measurement identity, filtering to be used on RRM measurements, measurement gaps for inter-frequency measurement that can be determined based on the MRS configurations.

At S716, the serving base 702 transmits MRS through the serving cell of the UE 701 according to the MRS configuration of the serving cell. At S718, the neighboring base stations 703 transmit MRSs through respective neighboring cells of the UE 702 according to respective MRS configurations of each neighboring cell. At S716 and S718, beamforming and scalable numerology may be employed at some neighboring cells or the serving cell.

At S720, the UE 701 performs the RRM measurement process according to the RRM configuration and the MRS configurations of the neighboring cells and the serving cells of the UE 701. The RRM measurement can be performed by intra frequency measurement for cells operating on frequency of the serving cell, and inter frequency measurement for cells operating on frequencies different from the serving cell. RRM measurements generated based on MRSs received from the serving base station 702 and the neighboring base stations 703 can include RSRP, RSRQ, and other measurement qualities.

For example, in intra frequency measurement, based on MRS timing information, the UE 701 can capture MRS burst transmission occasions at opportune times. For inter frequency measurement, the measurement gaps configured by the serving base station 702 can be used to determine measurement timing. Based on cell ID, TRP ID, and/or Tx beam index corresponding to an MRS burst, a frequency location of an MRS can be determined. Based on transmission bandwidth and burst length of an MRS burst, REs carrying MRS can be suitably located. Based on Tx beam indexes, RRM measurements can be associated with respective Tx beams.

At S722, the obtained RRM measurements can be reported to the serving base station 702. According to the RRM configuration, the reporting can be event triggered or performed periodically.

At S724, a hand over decision may be determined by the serving base station 702 based on reported RRM measurements. Subsequently, a hand over process can be triggered and executed. The process 700 terminates after S724.

Figure 8:
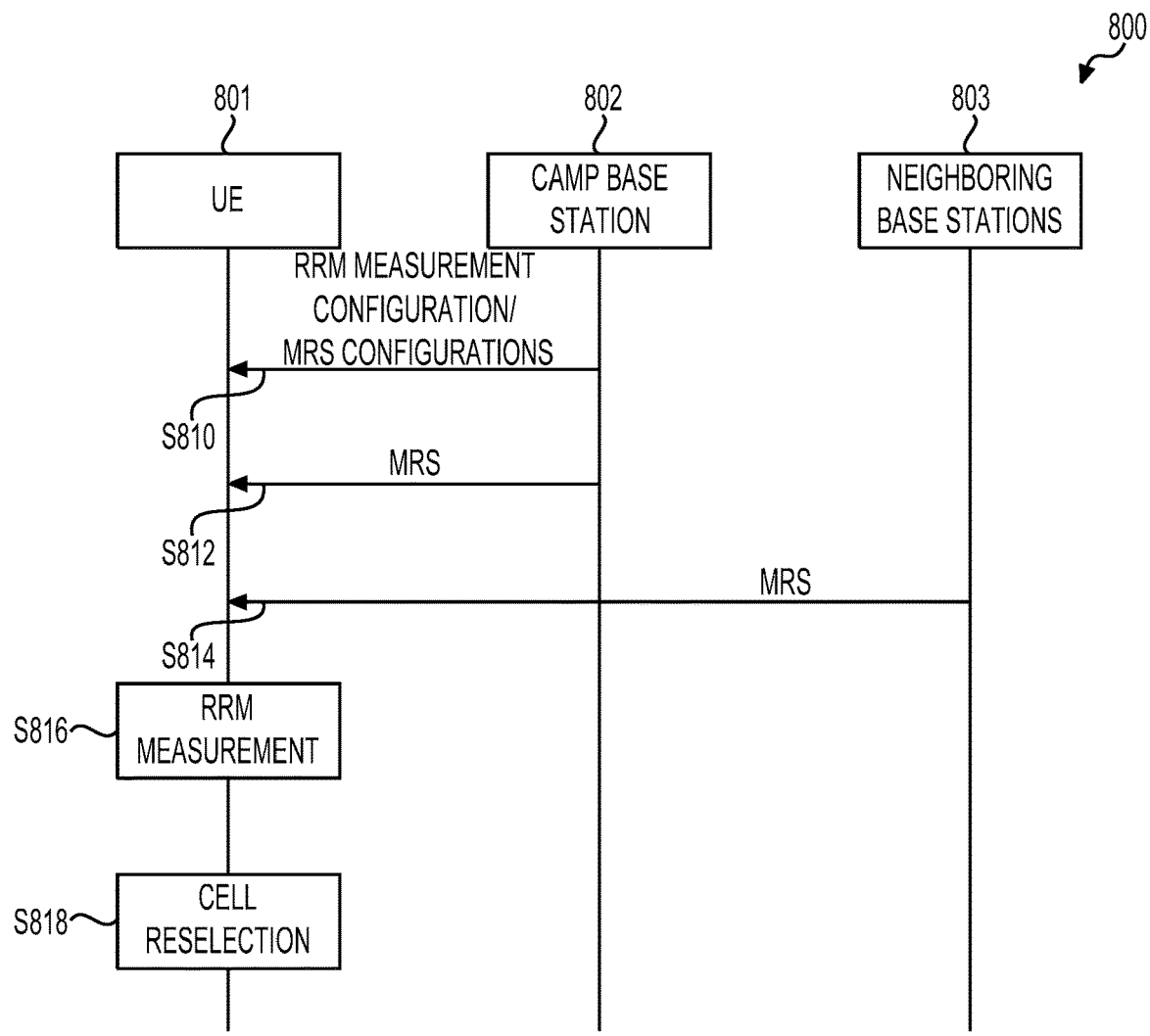
FIG. 8 shows an example RRC idle mode RRM measurement process according to an embodiment of the disclosure.

FIG. 8 shows an example RRC idle mode RRM measurement process 800 according to an embodiment of the disclosure. During the process 800, a UE 801 performs RRM measurement based on MRSs received from neighboring base stations 803 and a base station 802 which the UE 801 camps on. The base station 802 can thus be referred to as a camp base station 802. The UE 801 operates in RRC idle mode, and can be located within coverage of the neighboring base stations 803. The UE 801 can be in a moving state, and the process 800 can be performed to facilitate the UE 801 to reselect a base station to camp on. Specifically, RRM measurement performed by the UE 801 can be based on first MRS bursts included in the received MRSs. The first MRS bursts can be multiplexed with SS blocks in respective slots carrying the SS blocks. The process 800 can start from S810.

At S810, the UE 801 can receive an RRM measurement configuration from the camp base station 802. For example, the RRM measurement configuration can be included in system information periodically broadcasted from the camp base station 802.

The RRM measurement configuration can include MRS configurations of a serving cell and neighboring cells of the UE 801. For example, the camp base station 802 may control operations of the serving cell of the UE 801, and the neighboring base stations 803 may each control multiple TRPs corresponding to the neighboring cells of the UE 801. In one example, the MRS configurations can include a list of the neighboring cells, and their operating frequencies and numerology configurations.

In addition, in one example, an MRS configuration of a neighboring cell can include timing information (including periodicity) of the first MRS bursts (or equally the SS blocks or SS bursts), burst lengths of respective first MRS burst, frequency domain location (RE positions), and the like. In one example, transmission bandwidth of SS blocks in terms of a number PRBs can be standardized for each neighboring cell or the serving cell. Transmission bandwidths of the first MRS bursts can be determined according to a respective SS block bandwidth.

Further, the MRS configurations can include cell IDs, TRP IDs, and/or Tx beam indexes of each neighboring cells. In some example, MRS sequences of a cell can be generated based on cell ID, TRP ID, and/or Tx beam indexes of the cell. Thus, based on the MRS configurations, RRM measurements corresponding to the MRS sequences of different cells, TRPs, or Tx beams can be distinguished, for example, based on a correlation based scheme. Knowledge of signal quality of different Tx beams can be used to facilitate beam management (e.g., beam tracking or beam switching) for beamformed transmission of the serving cell or neighboring cells.

In addition to the MRS configurations, the RRM measurement configuration can include other parameters for conducting the RRM measurement process or cell reselection. In alternative examples, the MRS configurations can be transmitted separately from transmission of the RRM measurement configuration.

At S812, an MRS can be transmitted from the camp base station 802 and received at the UE 801. At S814, MRSs can be transmitted from the neighboring base station 803 and received at the UE 801. In some examples, for idle mode UE 801, only first MRS bursts multiplexed with SS blocks are used for RRM measurement for purpose of cell reselection. However, it is noted that there can be second MRS bursts being transmitted from cells associated with the camp base station 802 or the neighboring base stations 803 that are being used by other UEs operating in RRC connected mode and performing RRM measurement.

At S816, the UE 801 can perform RRM measurement based on the RRM measurement configuration and the MRS configurations received at S810. For example, based on captured MRS bursts, RRM measurements (e.g., RSRP, RSPQ, etc.) can be generated for different cells, TRPs, and/or Tx beams.

At S818, the UE 801 can make a decision to reselect a neighboring cell to camp on based on the RRM measurements obtained at S816. For example, when a signal quality of the serving cell is below a signal quality of a neighboring cell with a quality difference larger than a threshold for a preconfigured period, a cell reselection process can be triggered. The process 800 can be terminated after S818.

While the MRS including first and second MRS bursts described herein can be used for downlink RRM measurement, in various examples, the MRS can also be used for other purposes. In one example, as an MRS (or a part of an MRS) can be mapped to REs in symbols carrying PBCH, the MRS can be used for channel estimation in RRC connected mode or RRC idle mode, and results of the channel estimation can be used for coherent demodulation of the PBCH in RRC connected mode or RRC idle mode. In one example, the MRS described herein can be used for channel property estimation in RRC connected mode and RRC idle mode, such as estimation of Doppler spread, or delay spread. Results of the channel property estimation can be used for adaptive signal reception. For example, a frequency synchronization can be performed to compensate Doppler spread, or a channel equalization can be performed to compensate delay spread.

In one example, the MRS described herein can be used for tracking time and/or frequency synchronization in RRC connected mode and RRC idle mode. As one MRS burst can include RS sequences in multiple symbols, performance of time and frequency tracking can be improved compared with an RS carried in one symbol during a transmission occasion. For applications of channel property estimation and time/frequency synchronization tracking, the MRS described herein can be adaptively configured with various transmitted periodicity for different channel conditions that may vary with different speed.

Figure 9:
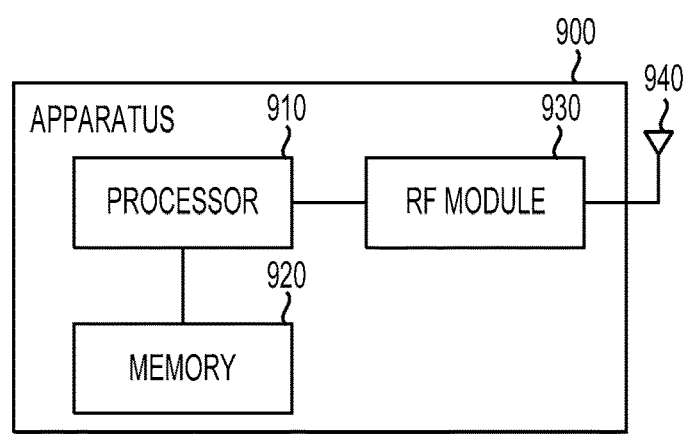
FIG. 9 shows an example apparatus according to some embodiments of the disclosure.

FIG. 9 shows an example apparatus 900 according to some embodiments of the disclosure. The apparatus 900 can be used to implement various embodiments of the disclosure. The apparatus 900 can include a processor 910, a memory 920, and a radio frequency (RF) module 930. Those components are coupled together as shown in FIG. 9. In some examples, the apparatus 900 can be used to implement the base stations described herein. Accordingly, the processor 910 can be configured to perform various functions or processes performed by the base stations described herein. In other examples, the apparatus 900 can be used to implement the UEs described herein. Accordingly, the processor 910 can be configured to perform various functions or processes performed by the UEs described herein.

The processor 910 can be implemented with hardware, software, or a combination thereof. In some examples, the processor 910 can be implemented with application specific integrated circuits (ASIC), field programmable gate arrays (FPGA), and the like, that include circuitry. The circuitry can be configured to perform various functions described herein. In one example, the memory 920 can store program instructions that cause the processor 910 to perform various functions. The memory 920 can include read only memory (ROM), random access memory (RAM), flash memory, a hard disk drive, and the like.

The RF module 930 can receive a digital signal from the processor 910 and transmits the signal to a receiver via an antenna 940, or receive a wireless signal from a transmitter and accordingly generates a digital signal which is supplied to the processor 910. The RF module 930 can include digital to analog (DAC)/analog to digital (CAD) converters, frequency down/up converters, filters, and amplifiers for reception and transmission operations. When the apparatus 900 is used to implement a base station, the antenna 940 can include one or more TRPs that each includes one or more antenna elements.

The apparatus 900 can optionally include other components, such as input and output devices, additional CPU or signal processing circuitry, and the like. Accordingly, the apparatus 900 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for transmission of downlink mobile reference signals (MRSs) in a wireless communication network, comprising:
   transmitting an MRS that includes a first part MRS and an additional part MRS, wherein the first part MRS includes first MRS bursts each multiplexed with a synchronization signal block (SS block), and the additional part MRS includes second MRS bursts and is configurable to be transmitted or not transmitted.

2. The method of claim 1, further comprising:
   transmitting a first or second MRS burst including a plurality of MRS symbols on a series of beams during a beam sweeping.

3. The method of claim 2, wherein an MRS sequence transmitted on a beam is generated based on a beam index of the beam such that the MRS sequence indicates the beam index of the beam.

4. The method of claim 1, wherein a burst length of a first or second MRS burst is configurable.

5. The method of claim 1, further comprising:
   transmitting an MRS configuration corresponding to a serving cell or a neighboring cell of a user equipment (UE) that includes a configuration parameter defining second MRS bursts transmitted from the corresponding cell to the UE,
   time offset with respect to SS block.

6. The method of claim 1, further comprising:
   determining a transmission periodicity of the MRS according to a speed of the UE.

7. The method of claim 1, wherein sequences of the MRS are generated based on one or more of a cell identification (ID), a transmission reception point (TRP) ID, or a transmission (Tx) beam of a serving cell transmitting the MRS.

8. The method of claim 1, wherein a frequency domain location of the first or second MRS bursts depends on a cell ID, a TRP ID, or a Tx beam index of a serving cell transmitting the MRS.

9. The method of claim 1, wherein the first or second RS bursts are not transmitted in subframes or slots of a serving cell where neighboring cells have uplink transmissions.

10. A method for radio resource control (RRC) connected mode radio resource management (RRM) measurement in a wireless communication network, comprising:
    receiving at a user equipment (UE) mobile reference signal (MRS) configurations corresponding to a serving cell and neighboring cells of the UE;
    receiving MRSs transmitted from the serving cell and the neighboring cells of the UE according to the MRS configurations,
    wherein each MRS includes a first part MRS and an additional part MRS, and the first part MRS includes first MRS bursts each multiplexed with a synchronization signal block (SS block), and the additional part MRS includes second MRS bursts and is configurable to be transmitted or not transmitted; and
    generating RRM measurements based on the received MRSs.

11. The method of claim 10, wherein one of the MRS configurations includes a configuration parameter for defining the second MRS bursts of a respective cell,
    time offset with respect to SS block.

12. The method of claim 10, further comprising:
    based on the received MRSs, performing one or more of following functions: demodulation of a physical broad cast channel (PBCH) in block the SS block multiplexed with the first MRS burst, time synchronization tracking, frequency synchronization tracking, or channel property estimation.

13. The method of claim 10, further comprising:
    receiving a first or second MRS burst including multiple MRS symbols from a series of beams transmitted from the serving cell or one of the neighboring cells during a beam sweeping.

14. The method of claim 13, wherein an MRS sequence received from a beam is generated based on a beam index of the beam such that the MRS sequence indicates the beam index of the beam.

15. The method of claim 10, wherein an MRS sequence is generated based on a cell identification (ID), a transmission reception point (TRP) ID, or a transmission (Tx) beam index of the serving cell or one of the neighboring cells.

16. The method of claim 10, wherein a frequency location of a first or second MRS burst is determined based on a cell ID, a TRP ID, or a Tx beam index of the serving cell or one of the neighboring cells that transmits the first or second MRS.

17. The method of claim 10, further comprising:
    receiving the MRS configurations by RRC signaling, broadcasted or multi-casted system information, or a combination of RRC signaling and broadcasted or multi-casted system information.

18. The method of claim 10, wherein the second MRS bursts have a transmission bandwidth equal to or larger than that of the SS blocks.

19. The method of claim 10, wherein a burst length of the first or second MRS bursts is longer than a burst length of SS bursts each including the SS block.

20. A method for radio resource control (RRC) idle mode radio resource management (RRM) measurement, comprising:
    receiving at a user equipment (UE) mobile reference signals (MRSs) transmitted from a serving cell and neighboring cells of the UE, wherein each MRS includes first MRS bursts each multiplexed with a synchronization signal block (SS block), a burst length of the first MRS bursts being longer than a burst length of SS bursts each including the SS block;
    wherein each MRS is generated based on a cell identification (ID), a transmission and reception point (TRP) ID, or a transmission (Tx) beam index of a respective cell corresponding to the MRS; and
    generating RRM measurements based on the received MRSs.

21. The method of claim 20, further comprising:
    based on the received MRSs, performing one or more of following functions: demodulation of a physical broad cast channel (PBCH) in the SS block multiplexed with the first MRS burst, time synchronization tracking, frequency synchronization tracking, or channel property estimation.

* * * * *